US012162289B2

(12) United States Patent
Maruyama et al.

(10) Patent No.: US 12,162,289 B2
(45) Date of Patent: Dec. 10, 2024

(54) INKJET PRINTING APPARATUS

(71) Applicant: MIMAKI ENGINEERING CO., LTD., Nagano (JP)

(72) Inventors: Kyohei Maruyama, Nagano (JP); Masayuki Furuse, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 22 days.

(21) Appl. No.: 17/946,039

(22) Filed: Sep. 16, 2022

(65) Prior Publication Data

US 2023/0086034 A1 Mar. 23, 2023

(30) Foreign Application Priority Data

Sep. 22, 2021 (JP) ................................ 2021-153773

(51) Int. Cl.
*B41J 2/175* (2006.01)
*B41J 2/14* (2006.01)

(52) U.S. Cl.
CPC ....... *B41J 2/17563* (2013.01); *B41J 2/14024* (2013.01); *B41J 2002/14403* (2013.01)

(58) Field of Classification Search
CPC ................ B41J 2/17563; B41J 2/14024; B41J 2002/14403; B41J 2/175; B41J 2/14201
See application file for complete search history.

(56) References Cited

U.S. PATENT DOCUMENTS

| | | | | |
|---|---|---|---|---|
| 2002/0038614 A1* | 4/2002 | Momose | C09D 11/38 | 106/31.75 |
| 2004/0061747 A1* | 4/2004 | Nakao | B41J 2/17509 | 347/85 |
| 2006/0050113 A1* | 3/2006 | Sakurai | B41J 2/175 | 347/85 |
| 2007/0283648 A1* | 12/2007 | Chen | E04F 15/02033 | 52/311.1 |
| 2012/0249623 A1* | 10/2012 | Vasudevan | C09D 11/38 | 524/145 |

FOREIGN PATENT DOCUMENTS

| | | |
|---|---|---|
| JP | H05131645 | 5/1993 |
| JP | 4911303 | 4/2012 |

* cited by examiner

*Primary Examiner* — Sharon Polk
(74) *Attorney, Agent, or Firm* — JCIPRNET

(57) ABSTRACT

An inkjet printing apparatus includes an inkjet head that moves in a main scanning direction at the time of printing; a filter chamber provided on a path for supplying ink to a nozzle hole (nozzle) in the inkjet head; and a spherical body placed on a head filter in the filter chamber. The spherical body has a diameter φ larger than the mesh of the head filter. The spherical body is disposed on the head filter so as to be rollable by the movement of the inkjet head.

14 Claims, 5 Drawing Sheets

[Table 2]

| | Before test | After test | | |
|---|---|---|---|---|
| | | A. Without stirring body | With stirring body | |
| | | | B. Parallel pin | C. Sphere |
| 1. Surface image | | |  |  |
| 2. Area analysis |  |  |  |  |

INKJET PRINTING APPARATUS

CROSS REFERENCE TO RELATED APPLICATIONS

This application claims the priority benefit of Japanese Patent Application No. 2021-153773, filed on Sep. 22, 2021. The entirety of the above-mentioned patent application is hereby incorporated by reference herein and made a part of this specification.

TECHNICAL FIELD

The present disclosure relates to an inkjet printing apparatus.

DESCRIPTION OF THE BACKGROUND ART

Some inkjet printing apparatuses have a filter chamber disposed in the middle of an ink supply path from an ink cartridge to a nozzle of a head unit. A filter is disposed in the filter chamber, and ink from which foreign substances and the like have been removed is supplied to the head unit.

Japanese Unexamined Patent Publication No. H05-131645 discloses providing a stirring member (plate, ball) on the upstream side of a filter in a flowing direction of ink to generate a turbulent flow in a filter chamber in order to eliminate air bubbles in the filter chamber.

Japanese Patent Publication No. 4911303 discloses disposing a floating body in a filter chamber to generate a turbulent flow in the filter chamber and suppress clogging of the filter.

SUMMARY

The stirring body and the floating body merely generate turbulent flow in the flow of ink, and it is difficult to prevent occurrence of a bridging phenomenon in the filter. When the bridging phenomenon occurs, fine particles and the like in the ink aggregate and crosslink so as to cover the opening of the filter, resulting in clogging of the filter.

In particular, a so-called aggregation type ink tends to easily generate particulate aggregates in the ink when an external stimulus acts. Therefore, it has been difficult to prevent clogging of the filter due to the bridging phenomenon.

Therefore, it is required to suppress the occurrence of the bridging phenomenon.

The present disclosure relates to (1) an inkjet printing apparatus including an inkjet head that moves in a scanning direction at the time of printing;

a filter chamber provided on a path for supplying ink to a nozzle in the inkjet head; and a rolling element placed on a filter in the filter chamber; where the rolling element has a diameter larger than a mesh of the filter; and the rolling element is disposed on the filter so as to be rollable by movement of the inkjet head.

(2) The rolling element is a spherical body formed of a nonmagnetic metal.

(3) The spherical body is placed in plurals on the filter, and a ratio of projection areas of the spherical bodies with respect to an area of the filter is greater than or equal to 3% and less than or equal to 30%.

(4) The spherical body is placed in plurals on the filter, and a sum of the projection areas of the spherical bodies with respect to the filter is ⅓ to 1/30 of the area of the filter.

(5) The ink is an ultraviolet curable ink.

(6) The ink is a support material ink used for three-dimensional shaping.

According to the present disclosure, occurrence of a bridging phenomenon can be suppressed.

DETAILED DESCRIPTION OF EMBODIMENTS

Hereinafter, a case where an embodiment of the present disclosure is applied to an inkjet printing apparatus 1 that performs printing on a medium M will be described by way of an example.

Figure 1:
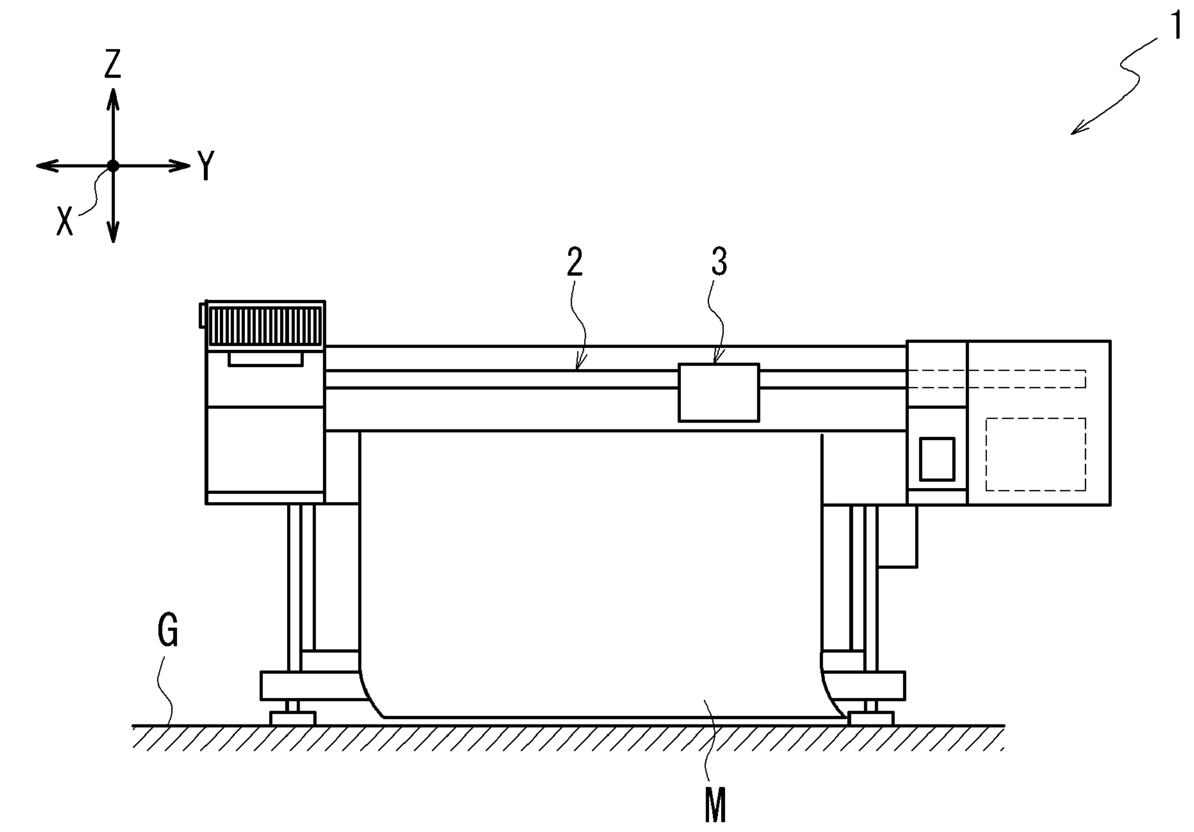
FIG. 1 is a view describing an inkjet printing apparatus.

FIG. 1 is a schematic view describing an inkjet printing apparatus 1.

Figure 2:
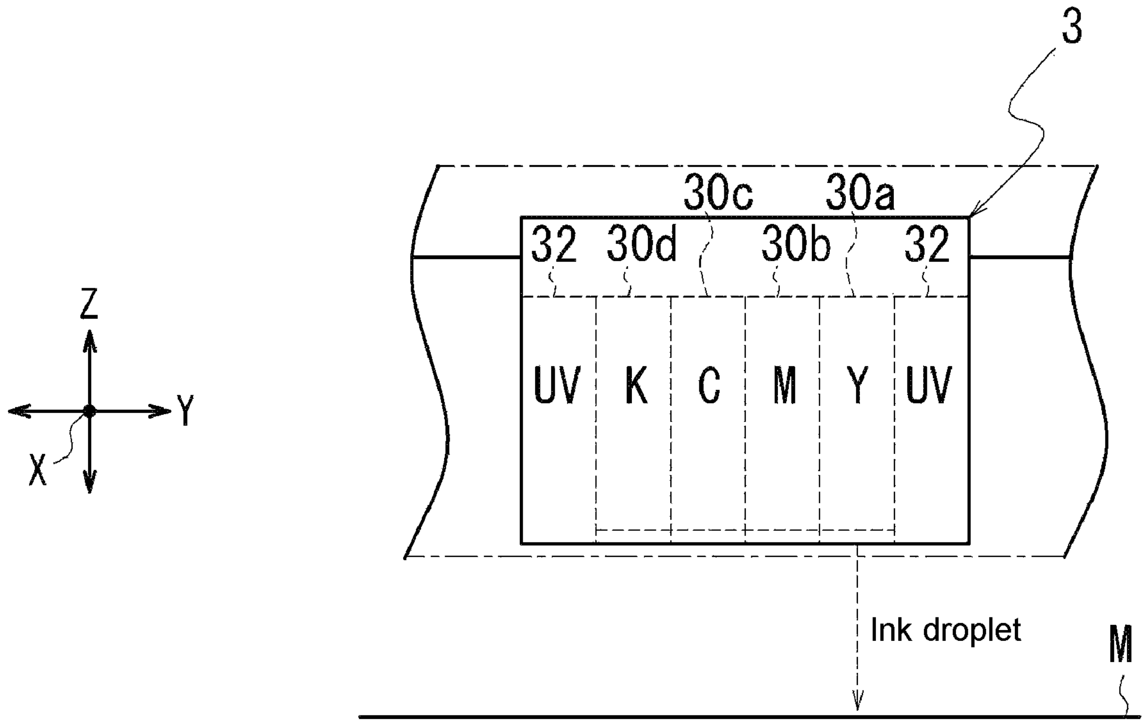
FIG. 2 is an enlarged view of a main part of the inkjet printing apparatus.

FIG. 2 is a view showing a portion of a carriage 3 in an enlarged manner.

In each drawing, the reference sign "Y" means the main scanning direction, the reference sign "X" means the sub-scanning direction, and the reference sign "Z" means the vertical direction.

As shown in FIG. 1, in the inkjet printing apparatus 1, the carriage 3 is supported by a guide rail 2 arranged horizontally. The carriage 3 is provided to be movable forward and backward in the longitudinal direction (main scanning direction Y) of the guide rail 2.

As shown in FIG. 2, a plurality of inkjet heads 30 (30*a* to 30*d*) and a UV irradiator 32 are mounted on the carriage 3. In the following description, the inkjet heads 30*a* to 30*d* are also simply referred to as inkjet heads 30 when they are not distinguished.

The medium M is located below the carriage 3. When printing is performed on the medium M, the carriage 3 moves on the guide rail 2 in the main scanning direction Y. At this time, ink droplets are ejected from the respective inkjet heads 30 (30*a* to 30*d*) onto the surface of the medium M based on a command of a control device (not shown), and an image is formed on the surface of the medium M.

When the ink used for printing is an ultraviolet curable ink, the ink droplets landed on the medium M are irradiated with ultraviolet light from the UV irradiator 32 to solidify and fix the ink droplets.

Figure 3:
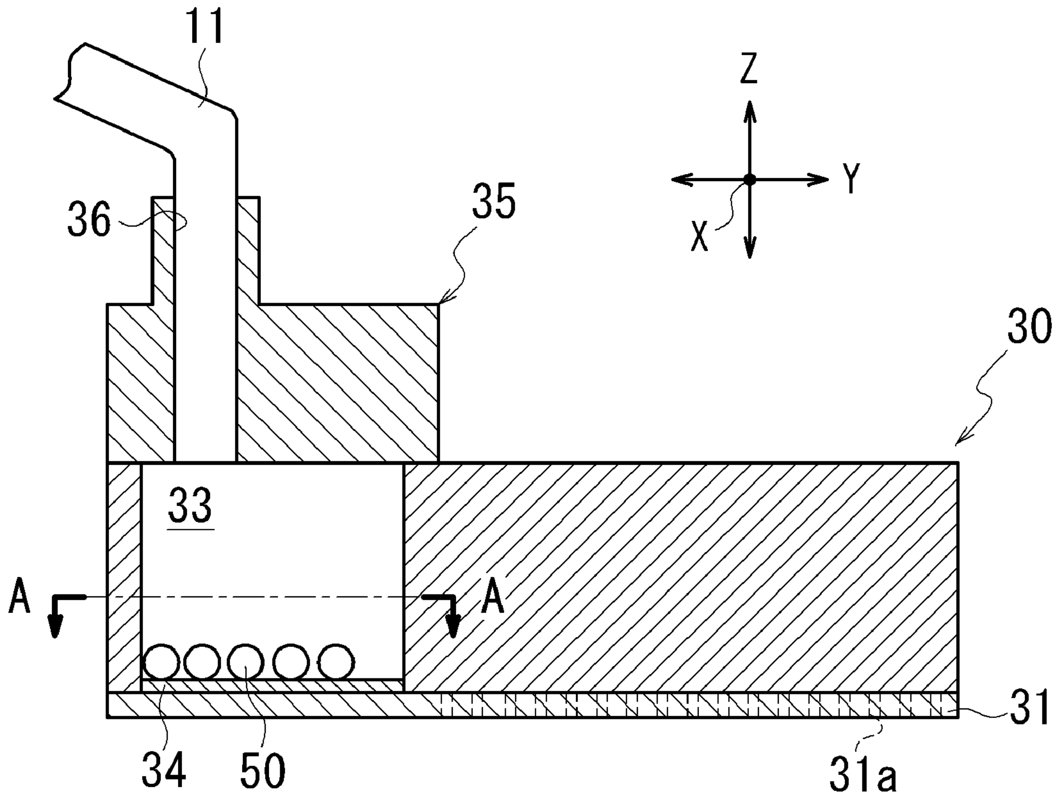
FIG. 3 is a view schematically showing a cross-section of an inkjet head.

FIG. 3 is a view schematically showing a cross-section of the inkjet head 30.

The inkjet head 30 has a nozzle plate 31 at a portion facing the medium M.

In the nozzle plate 31, nozzle rows formed by a plurality of nozzle holes 31*a* are lined in the same direction.

A head port 35 having an ink supply port 36 is attached to an upper portion of the inkjet head 30. An ink supply pipe 11 extending from the ink tank 10 is connected to the ink supply port 36. The ink supply port 36 communicates with a filter chamber 33. The ink in the ink tank 10 is supplied to the filter chamber 33 through the ink supply port 36.

The ink supplied to the filter chamber 33 is supplied to an ink ejection chamber (not illustrated) through the head filter 34. A piezoelectric element is provided in the ink ejection chamber. When the piezoelectric element is driven, the ink in the ink ejection chamber is ejected from the nozzle hole 31*a* toward the medium M.

Here, the head filter 34 is provided in a direction along the horizontal line direction, and the ink supplied to the filter chamber 33 passes through the head filter 34 from the upper side to the lower side.

The horizontal line direction means a horizontal line direction based on an installation state with respect to an installation surface G (see FIG. 1) of the inkjet printing apparatus 1.

The meshes (openings) of the head filter 34 used have different optimum apertures depending on the type of the inkjet head 30. In the present embodiment, as an example, the head filter 34 having an opening of 5 to 8 μm is adopted.

Fine particles such as pigments and resins are dispersed in the ink. Therefore, fine particles and the like in the ink may aggregate to cause a phenomenon (bridging phenomenon) of crosslinking so as to cover the mesh of the head filter 34. Then, the head filter 34 may be clogged by the aggregated particles or the like.

In the present embodiment, a rolling element (spherical body 50) is disposed in the filter chamber 33 for the purpose of preventing clogging of the head filter 34.

Specifically, at least one rolling element (spherical body 50) is placed on the head filter 34 provided in a direction along the horizontal line.

In the present embodiment, a spherical body 50 having a circular outer shape in top view is placed on the head filter 34. Here, the "spherical body" in the present specification merely needs to have roundness to such an extent that point contact can be made with the upper surface of the head filter 34. Therefore, the spherical body 50 does not need to be a perfect circle. Therefore, even a spherical body having an elliptical outer shape in top view can be adopted as long as the spherical body can be in point contact with the upper surface of the head filter 34.

In the present embodiment, the spherical body 50 rolls on the surface of the head filter 34 with a moment (acceleration) when the carriage 3 moves in the main scanning direction Y at the time of printing on the medium M.

In the present disclosure, it is considered that the rolling spherical body 50 produces the following action to suppress the occurrence of the bridging phenomenon.

(a) The rolling spherical body 50 generates convection of ink on the surface of the head filter 34 to disperse the aggregated particles on the surface of the head filter 34.

(b) The rolling spherical body 50 moves while pushing away the particles aggregated on the surface of the head filter 34, thereby dispersing the particles aggregated on the surface of the head filter 34.

(c) The rolling direction of the spherical body 50 is not limited to a specific direction. Therefore, as a result of the spherical body 50 moving randomly without being deviated to a specific region on the upper surface of the head filter 34, the occurrence of the bridging phenomenon is suppressed over a wide range without being deviated only to the specific region of the head filter 34.

Here, when the spherical body 50 sinks in the ink passing through the filter chamber 33, buoyancy acts on the spherical body 50. When the spherical body 50 is separated from the surface of the head filter 34 by the acting buoyancy, the spherical body 50 may not be able to roll on the surface of the head filter 34 at the time of printing, and the actions (a), (b), and (c) may not be exhibited.

For example, since a resin spherical body has a low specific gravity, there is a possibility that the spherical body floats from the surface of the head filter 34 when the spherical body sinks in the ink. Furthermore, the spherical body needs to have such a density that the spherical body can roll and move (roll) on the upper surface of the head filter 34 with the movement of the inkjet head 30 while physically coming into contact with the upper surface of the head filter 34.

Therefore, in the present embodiment, a spherical body formed of a nonmagnetic metal material, specifically, a spherical body made of stainless steel having a high specific gravity and excellent durability is adopted.

The spherical body 50 is at least formed with a diameter larger than the mesh (opening) of the head filter 34. In the present embodiment, a spherical body of 1 φ (diameter: 1 mm) is used as an example. This is because, if the diameter of the spherical body 50 is smaller than the mesh of the head filter 34, the spherical body 50 may be clogged in the mesh of the head filter 34, or the like, which may cause trouble in the rolling of the spherical body 50.

Figure 4A:
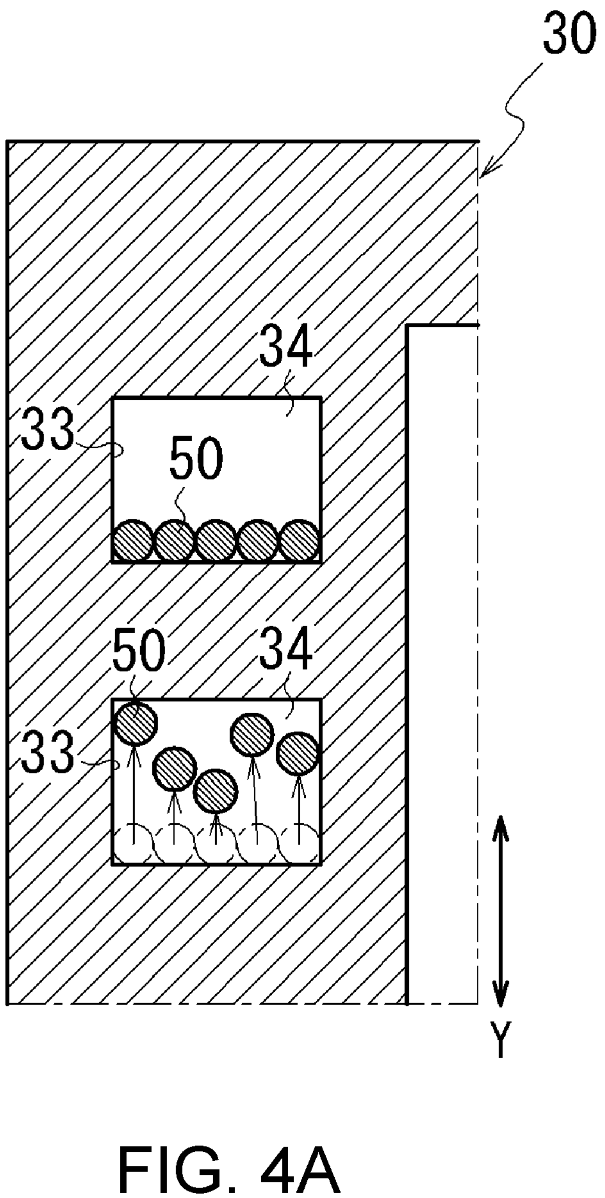
FIG. 4A to FIG. 4C are diagrams for explaining a relationship between a head filter and a spherical body.
Figure 4B:
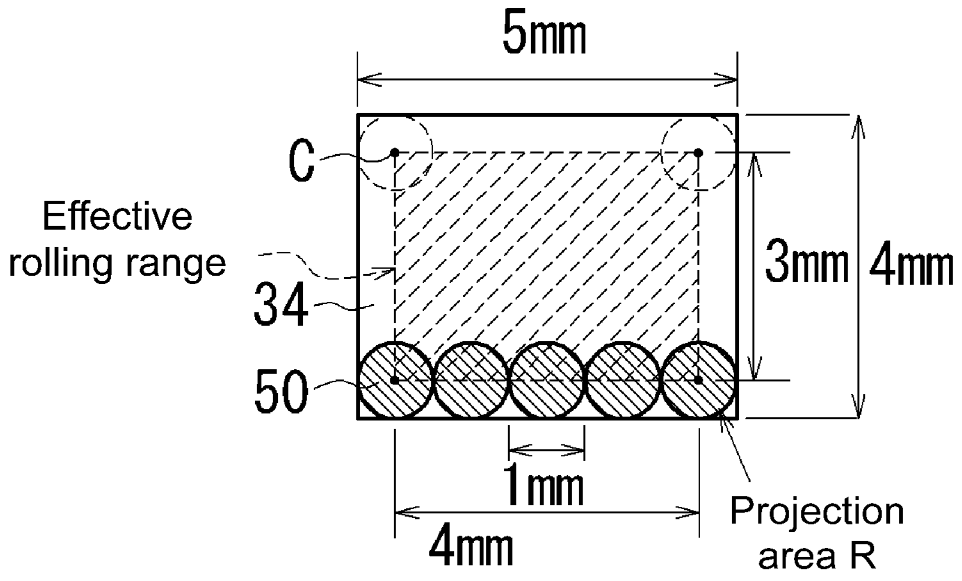
Figure 4C:
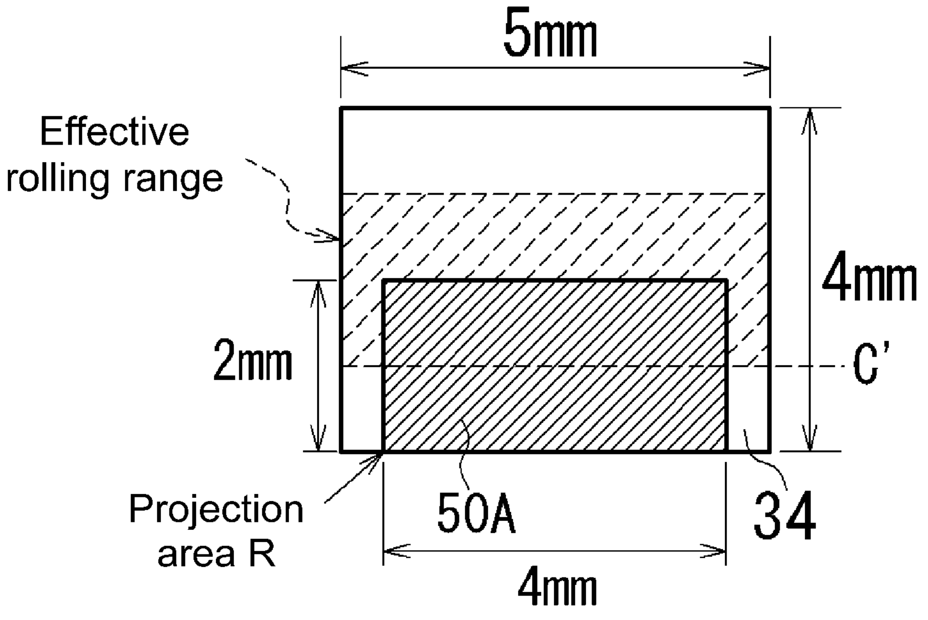

FIG. 4A to FIG. 4C are diagrams for explaining a relationship between a head filter 34 and a spherical body 50. FIG. 4A is a schematic view showing the periphery of the filter chamber 33 in the inkjet head 30 in an enlarged manner. FIG. 4A corresponds to a cross-sectional view taken along line A-A in FIG. 3. FIG. 4B is a view describing a projection area of the spherical body 50 with respect to an area of the head filter 34. FIG. 4C is a view describing a projection area of a parallel pin 50A with respect to an area of the head filter 34.

In FIGS. 4B and 4C, the effective rolling range and the projection area of the spherical body 50 and the parallel pin 50A are shown with hatching.

In the cross-sectional view, the filter chamber 33 has a substantially rectangular shape, and an opening on a lower side (nozzle plate 31 side) of the filter chamber 33 is covered with the head filter 34. The ink supplied to the filter chamber 33 passes through the head filter 34 from the upper side to the lower side, and is supplied to the nozzle plate 31 side.

The usage area of the head filter 34 is substantially the same as the opening area of the filter chamber 33 in the cross-sectional view. The spherical body 50 is a spherical body in point contact with the upper surface of the head filter 34, and has a circular outer shape in top view.

In the inkjet printing apparatus 1, the inkjet head 30 moves in the main scanning direction Y at the time of printing on the medium M.

In the present embodiment, the total number and the diameter of the spherical bodies 50 arranged in the filter chamber 33 are determined so that the spherical bodies 50 can freely roll in the filter chamber 33 when the inkjet head 30 moves.

Specifically, the total number and the diameter of the spherical bodies are set such that the ratio (arrangement density of the spherical bodies) of the sum of the projection areas of each of the spherical bodies with respect to the area of the head filter 34 is greater than or equal to 3% and less than or equal to 30%.

Here, in a case where the diameter of each spherical body 50 is φ, the projection area R of one spherical body 50 is $\pi(\varphi/2)^2$. Here, the projection area R of the spherical body 50 is a hatched circular region ($R=\pi(\varphi/2)^2$) in FIG. 4B.

The total number of spherical bodies 50 placed on the head filter 34 is N. The projection area R2 of the entire spherical body is $N\times\pi(\varphi/2)^2$ ($R2=N\times\pi(\varphi/2)^2$).

Then, the ratio of the projection area R2 of all the spherical bodies with respect to the area R1 of the head filter 34 is $R2/R1=(N\times\pi(\varphi/2)^2)/R1$.

In the present embodiment, the arrangement density (R2/R1) and the diameter φ of the spherical bodies are set so that the ratio of the projection area R2 of all the spherical bodies with respect to the area R1 of the head filter 34 satisfies the following relationship of greater than or equal to 3% and less than or equal to 30%.

$$0.03 \leq \text{arrangement density} \leq 0.3 \quad (1)$$

Therefore, for example, in a case where the area R1 of the head filter 34 is 20 $mm^2$, and the diameters of the spherical bodies 50 are 1φ (1.0 mm), 1.5 φ(1.5 mm), and 2φ(2.0 mm), the values of the projection area and the arrangement density of the spherical bodies are as shown in the following table.

TABLE 1

| Diameter of spherical body (1 φ = 1 mm) | | | | | | | | | |
|---|---|---|---|---|---|---|---|---|---|
| Total number of spherical bodies | 1 | 2 | 3 | 4 | 5 | 6 | 7 | 8 | 9 |
| Projection area | 0.79 | 1.57 | 2.36 | 3.14 | 3.93 | 4.71 | 5.50 | 6.28 | 7.0 |
| Arrangement density | 0.04 | 0.08 | 0.12 | 0.16 | 0.20 | 0.24 | 0.27 | 0.31 | 0.35 |
| **Diameter of spherical body (1.5 φ = 1.5 mm)** | | | | | | | | | |
| Total number of spherical bodies | 1 | 2 | 3 | 4 | 5 | 6 | 7 | 8 | 9 |
| Projection area | 1.77 | 3.53 | 5.30 | 7.07 | | | | | |
| Arrangement density | 0.09 | 0.18 | 0.26 | 0.35 | | | | | |
| **Diameter of spherical body (2 φ = 2 mm)** | | | | | | | | | |
| Total number of spherical bodies | 1 | 2 | 3 | 4 | 5 | 6 | 7 | 8 | 9 |
| Projection area | 3.14 | 6.28 | | | | | | | |
| Arrangement density | 0.15 | 0.31 | | | | | | | |

Therefore, the total number N of spherical bodies satisfying the above equation (1) is 1 to 7 in the case of where the spherical bodies of lip (1 mm) are used.

When the spherical bodies of 1.5 φ(1.5 mm) are used, the total number is 1 to 4. When the spherical bodies of 2φ(2 mm) are used, the total number is 1 to 2.

When the arrangement density decreases, the suppression of the bridging phenomenon becomes insufficient, and there is a high possibility that the passing of the ink through the head filter 34 is inhibited.

Therefore, the ratio (arrangement density) of the projection area R2 of all the spherical bodies with respect to the area R1 of the head filter 34 is preferably greater than or equal to 3% and less than or equal to 30%, but preferably greater than or equal to 5% and less than or equal to 20%, or greater than or equal to 10% and less than or equal to 20%.

When the arrangement density exceeds 30%, the resistance when the ink passes through the head filter 34 increases. When the arrangement density is less than 3%, the suppression of the bridging phenomenon becomes insufficient.

Therefore, in a case where the condition of the arrangement density is greater than or equal to 5% and less than or equal to 20%, when the diameter of the spherical body 50 is 1φ(1 mm), the total number of spherical bodies is 2 to 5. When the diameter of the spherical body 50 is 1.5φ(1.5 mm), the total number of spherical bodies is 1 to 3. When the diameter of the spherical body 50 is 2φ(2 mm), the total number of spherical bodies is 1.

Therefore, in a case where the condition of the arrangement density is greater than or equal to 10% and less than or equal to 20%, when the diameter of the spherical body 50 is 1φ(1 mm), the total number of spherical bodies is 3 to 5. When the diameter of the spherical body 50 is 1.5φ(1.5 mm), the total number of spherical bodies is 2 or 3. When the diameter of the spherical body 50 is 2φ(2 mm), the total number of spherical bodies is 1.

Here, the degree of clogging of the head filter after passing the ink under the following conditions was verified for each of (A) a case where the rolling elements (spherical body 50, parallel pin 50A) were placed on the head filter 34 and (B) a case where the spherical bodies 50 were not placed on the head filter 34.

Hereinafter, the verification conditions and the verification results will be described.

[Verification Condition]

<Head Filter>

A rectangular head filter having an area of 4 mm×5 mm was used.

In the verification, the head filter was disposed in a filter chamber having an opening of 4 mm×5 mm in the pseudo head, and the ink supplied to the filter chamber was caused to flow through the filter from the upper side to the lower side. The filter area in this case is 20 $mm^2$.

<Rolling Element>

(A) Spherical Body

Five stainless steel spherical bodies 50 having a diameter of 1φ(diameter 1 mm) were placed on the head filter in the pseudo filter chamber (see FIG. 4B). In this case, the projection area R of the five spherical bodies with respect to the head filter 40 is 3.93 $mm^2$.

(B) Parallel Pin

The parallel pin 50A having a diameter of 2φ(2 mm) and a length of 4 mm was placed on the head filter in the pseudo filter chamber (see FIG. 4C). In this case, the projection area R' of the parallel pin with respect to the head filter 40 is 8.0 $mm^2$.

<Test Conditions>

In order to simulate the scanning of the carriage (inkjet head) at the time of printing, the pseudo head was moved at a speed of 466 mm/s and an acceleration of 0.43 G, and the SP ink was caused to pass through the head filter while flowing at a water head difference of 50 cm under a normal temperature environment.

The verification results under the above test conditions are shown in Table 2 of FIG. 5 and in the following Tables.

Here, the surface image in Table 2 is an electron micrograph of the surface of the head filter 40 after the test. In the photomicrograph, the fewer the aggregates and foreign substances, the more the black color appears, and the aggregates and foreign substances appear in white color. In the area analysis, the region where the foreign substances are attached appears in red color.

Figure 5:
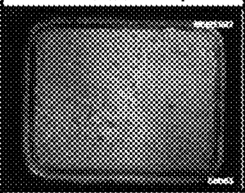
FIG. 5 shows Table 2 of the present disclosure which includes verification results under different test conditions.
Figure 5:
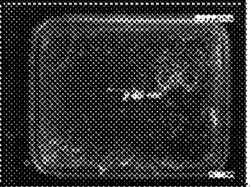
Figure 5:
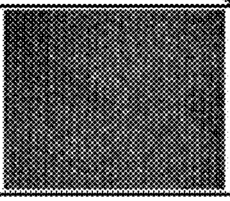
Figure 5:
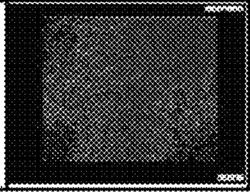
Figure 5:
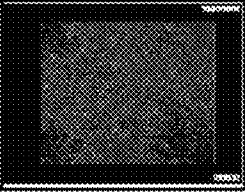
Figure 5:
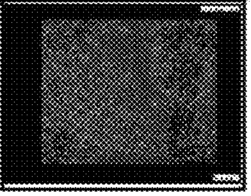

Please refer to FIG. 5 for the verification results shown in Table 2.

TABLE 3

| | Before test | After test | | |
|---|---|---|---|---|
| | | Without stirring body | With stirring body | |
| | | | Parallel pins | Sphere |
| Occlusion rate | 50.28% | 76.13% | 64.51% | 66.31% |
| Initial flow rate | 2.3 cc/min | — | — | — |
| Flow rate after test | — | 0 cc/min | 1.47 cc/min | 2.1 cc/min |
| Flow rate reduction rate | — | 100% | 36.20% | 8.50% |

In a case where the stirring body was not placed on the head filter, the occlusion rate of the head filter increased from 50.28% before the test to 76.13%. The reduction rate of the flow rate of the SP ink in the head filter was 100%.

In a case where one parallel pin serving as the stirring body was placed on the head filter, the occlusion rate of the filter increased from 50.28% before the test to 64.51%. The reduction rate of the flow rate of the SP ink was 36.20%.

In a case where five spherical bodies serving as the stirring body were placed on the head filter, the occlusion rate of the filter increased from 50.28% before the test to 66.31%. The reduction rate of the flow rate of the SP ink was 8.50%.

From the above, it was confirmed that when the rolling element was placed on the head filter, the decrease in the flow rate of the ink after the test was suppressed as compared with the case where the rolling element was not placed.

Furthermore, it was confirmed that when a spherical body was used as the stirring body, a decrease in the flow rate of the ink after the test was suppressed as compared with the case where the parallel pin was used.

As illustrated in FIG. 4B, the spherical body 50 comes into contact (point contact) with the upper surface of head filter 34 at point C. Therefore, the effective rolling range of the spherical body 50 in the head filter 34 of 4 mm×5 mm is a range of 3 mm×4 mm.

As illustrated in FIG. 4C, the parallel pin 50A comes into contact (line contact) with the upper surface of head filter 34 at line C'. Therefore, the effective rolling range of the parallel pin 50A in the head filter 34 of 4 mm×5 mm is a range of 2 mm×5 mm.

Therefore, as the rolling element, the spherical body 50 rolls in a wider range than the parallel pin 50A.

When the rolling elements are disposed in the filter chamber 33 of the inkjet head 30, the rolling elements are inserted from the ink supply port 36.

When the parallel pin 50A is placed on the head filter 34, the parallel pin 50A needs to be disposed in a direction in which the longitudinal direction of the parallel pin 50A is orthogonal to the main scanning direction Y. However, when the parallel pin 50A is inserted from the ink supply port 36, the longitudinal direction of the parallel pin 50A may not necessarily be in the direction orthogonal to the main scanning direction Y.

On the other hand, in the case of the spherical body 50, it is not necessary to align the direction.

Therefore, in the present embodiment, the spherical body 50 is adopted as the rolling element due to the width of the effective rolling range and the ease of installation. However, the use of the parallel pin 50A is not excluded.

When the plurality of spherical bodies 50 are placed on the head filter 34, the moving direction of the spherical bodies 50 is not limited to a specific direction as with the parallel pin 50A when the inkjet head 30 moves in the main scanning direction. Therefore, each of the spherical bodies 50 moves randomly (see FIG. 4A). As a result, the particles aggregated on the head filter 34 can be more reliably dispersed by the spherical bodies 50 passing through the region where the particles are aggregated. Thus, occurrence of the bridging phenomenon can be suppressed.

In the embodiment described above, the case where the ink passing through the head filter 34 in the filter chamber 33 is an ultraviolet curable ink has been exemplified. The ultraviolet curable ink has a high tendency to easily generate aggregates. Therefore, by placing a plurality of spherical bodies on the head filter 34, the possibility of occurrence of clogging can be reduced in the head filter 34 using the ultraviolet curable ink.

When the printing apparatus is a shaping apparatus of a stereoscopic structural object, the present disclosure is preferably applied to a filter chamber of an inkjet head that ejects a support material ink.

Here, the support material ink is an ink composition used for shaping a region (support region) that supports a shaped object. An example of the support material ink is disclosed in Japanese Unexamined Patent Publication No. 2018-183890.

In the shaping of the stereoscopic structural object, the usage amount of the support material ink is larger than the usage amount of other inks for forming the shaped object. Therefore, in the inkjet head for the support material ink, clogging of the filter easily occurs as compared with other inkjet heads.

Therefore, in the inkjet head using the support material ink, the possibility of occurrence of clogging in the head filter 34 can be reduced by placing a plurality of spherical bodies on the head filter 34.

In the embodiment described above, the case has been exemplified where the total number of spherical bodies to be placed is determined in consideration of the ratio of the sum R2 of the projection areas of the spherical bodies 50 with respect to the area R1 of the head filter 34 (see the above equation (1)).

Here, the total number and the diameter φ of the spherical bodies 50 may be set based on the area R1 of the head filter 34.

For example, the total number and the diameter φ of the spherical bodies 50 may be set so as to satisfy the following relationship in which the sum R2 of the projection areas of the spherical bodies 50 is greater than or equal to 1/30 and less than or equal to 1/3 of the area R1 of the head filter 34.

$$(R1/30) \leq \text{sum of projection areas of spherical bodies } R2 \leq (R1/3) \quad (2)$$

Therefore, for example, when the area R1 of the head filter 34 is 12 $mm^2$, the total number and the diameter φ of spherical bodies are set so as to satisfy the relationship in which the sum R2 of the projection areas of the spherical bodies 50 placed on the head filter 34 is greater than or equal to 0.4 $mm^2$ and less than or equal to 4 $mm^2$.

Referring to Table 1 described above, the total number N of spherical bodies satisfying the above equation (2) is 1 to 5 when the spherical bodies of 1φ(1 mm) are used.

When the spherical bodies of 1.5 φ(1.5 mm) are used, the total number is 1 to 2. When the spherical bodies of 2 φ(2 mm) are used, the total number is 1.

Furthermore, the total number of spherical bodies to be placed on the head filter 34 may be determined in consideration of the length L (see FIG. 4B) of the head filter 34 in the direction orthogonal to the main scanning direction Y of the inkjet head 30 and the diameter φ of the spherical body 50.

For example, as illustrated in FIG. 4B, when the head filter 34 has a length L (5 mm) in the direction orthogonal to the main scanning direction Y, and the spherical bodies 50 have a diameter φ(1 mm), at least five (5÷1=5) spherical bodies 50 can be lined in the direction orthogonal to the main scanning direction Y.

As shown in FIG. 4A, the moving direction of the spherical body 50 when the inkjet head 30 moves is random. Thus, the spherical body 50 may be deviated to one part while the inkjet head 30 repeats the movement.

Therefore, it is preferable to set the total number of spherical bodies 50 so that (i) the number of spherical bodies that can be lined in more than at least one row in the orthogonal direction of the main scanning direction Y on the head filter 34 is set, and (ii) the ratio of the sum of the projection areas of the spherical bodies with respect to the area of the head filter 34 is set so as not to exceed 30% described above.

For example, when the total number of spherical bodies 50 having a diameter of 1 mm is set to 7, the conditions (i) and (ii) are satisfied. In this case, even if a bias occurs in the arrangement of some of the spherical bodies 50, two spherical bodies exceeding 5 spherical bodies can fill the space formed by the bias. Thus, the spherical body 50 can roll in a wide range when the inkjet head 30 moves. When the condition (ii) is satisfied, the spherical body 50 is less likely to inhibit the flow of ink passing through the head filter 34.

Instead of the condition (ii), (iii) a condition in which the sum R2 of the projection areas of the spherical bodies 50 is less than or equal to ⅓ of the area R1 of the head filter 34 may be adopted.

As described above, the inkjet printing apparatus 1 having the following configuration is disclosed in the embodiment.

(1) The inkjet printing apparatus 1 includes an inkjet head 30 that moves in a main scanning direction Y at the time of printing;

a filter chamber 33 provided on a path for supplying ink to the nozzle hole 31*a* (nozzle) in the inkjet head 30; and a spherical body 50 placed on the head filter 34 (filter) in the filter chamber 33.

The spherical body 50 has a diameter φ larger than the mesh of the head filter 34.

The spherical body 50 is disposed on the head filter 34 so as to be rollable by the movement of the inkjet head 30.

According to such configuration, when the inkjet head 30 is displaced at the time of printing, the spherical body 50 placed on the head filter 34 rolls on the head filter 34. As a result, convection of the ink is generated on the surface of the head filter 34 by the rolling spherical body 50, the aggregated particles are dispersed, and the occurrence of the bridging phenomenon can be suppressed.

In addition, since the rolling spherical body 50 comes into contact with the aggregates on the surface of the head filter 34 and diffuse the aggregates, the occurrence of the bridging phenomenon can be suppressed.

(2) The spherical body 50 is made of a nonmagnetic metal material (stainless steel).

If the spherical body 50 is lightweight, when the spherical body 50 sinks in the ink passing through the filter chamber 34, the spherical body 50 may be lifted by buoyancy and move away from the head filter 34. Then, the convection of the ink cannot be generated on the surface of the head filter 34, and the occurrence of the bridging phenomenon may not be suppressed.

Therefore, by adopting the spherical body 50 formed of a nonmagnetic metal material, when the spherical body 50 sinks in the ink passing through the filter chamber 33, the spherical body 50 can be prevented from separating from the surface of the head filter 34 by buoyancy. As a result, the spherical body 50 placed on the head filter 34 rolls on the head filter 34 at the time of printing, so that convection of the ink is generated on the surface of the head filter 34 by the rolling spherical body 50, and the occurrence of the bridging phenomenon can be suppressed.

In addition, if the spherical body is made of resin, there is a possibility that the spherical body wears over time since the spherical body rolls on the upper surface of the head filter 34. When the spherical body wears, there is a possibility that the suppression of the occurrence of the bridging phenomenon becomes insufficient. Furthermore, if the spherical body is damaged due to wear, the generated fragments or the like may become foreign substances and may cause an undesirable influence on the head filter 34.

When formed of a material having magnetism, in a case where the spherical bodies are magnetized, there is a possibility that the spherical bodies gather by magnetic force or magnetically adhere to the wall constituting the filter chamber 34 and do not move. In such a case, as a result of the spherical body 50 not rolling on the upper surface of the head filter 34, there is a possibility that the occurrence of the bridging phenomenon cannot be suppressed.

As described above, the occurrence of such a situation can be suitably prevented by forming the spherical body from stainless steel.

(3) A plurality of spherical bodies 50 are placed on the head filter 34.

The spherical bodies 50 have an arrangement density at which the ratio of the sum R2 of the projection areas of the spherical bodies 50 with respect to the area R1 of the head filter 34 is greater than or equal to 3% and less than or equal to 30%.

When the arrangement density (R2/R1) of the spherical bodies 50 increases, the spherical bodies 50 collide with each other, and the rolling of the spherical bodies 50 on the head filter 34 becomes insufficient. Then, the range in which the spherical body 50 rolls in the head filter 34 is narrowed, and it becomes difficult to sufficiently generate the convection of the ink on the surface of the head filter 34.

Furthermore, when the arrangement density (R2/R1) of the spherical bodies 50 increases, the spherical bodies 50 become a resistance to the flow of ink passing through the head filter 34, and the flow rate of ink passing through the head filter 34 decreases.

Furthermore, when the arrangement density of the spherical bodies 50 decreases, the range in which the spherical bodies 50 in the head filter 34 actually roll becomes narrow, and it becomes difficult to sufficiently generate the convection of the ink on the surface of the head filter 34.

When the arrangement density of the spherical bodies 50 is set within the above range, convection necessary for dispersing the aggregates can be generated on the surface of the head filter 34. Therefore, the occurrence of the bridging phenomenon can be suppressed.

(4) A plurality of spherical bodies 50 are placed on the head filter 34.

The total number 50 and the diameter of the spherical bodies 50 are set such that the sum R2 of the projection areas of the spherical bodies 50 with respect to the area of the head filter 34 is ⅓ to 1/30 of the area R1 of the head filter 34.

With this configuration, convection necessary for dispersing the aggregates can be generated on the surface of the head filter 34. Therefore, the occurrence of the bridging phenomenon can be suppressed.

(5) The ink is an ultraviolet curable ink.

The ultraviolet curable ink is likely to generate aggregates. Therefore, the occurrence of the bridging phenomenon can be suppressed by applying to the inkjet printing apparatus adopting the ultraviolet curable ink.

(6) The ink is a support material ink used for three-dimensional shaping.

Since the amount of the support material used for three-dimensional shaping is large, clogging of the nozzle tends to easily occur. Therefore, the occurrence of the bridging phenomenon can be suppressed by applying to the inkjet printing apparatus used for three-dimensional shaping.

The present disclosure of the present application is not limited to the mode of the above-described embodiment, and can be appropriately changed within the scope of the technical idea of the present disclosure of the present application.

What is claimed is:

1. An inkjet printing apparatus comprising:
- an inkjet head that moves in a scanning direction at a time of printing;
- a filter chamber provided on a path for supplying ink to a nozzle in the inkjet head; and
- a rolling element placed on a filter in the filter chamber; wherein
- the rolling element has a diameter larger than a mesh of the filter; and
- the rolling element is disposed so as to be rollable on the filter in the scanning direction by movement of the inkjet head.

2. The inkjet printing apparatus according to claim 1, wherein the rolling element is a spherical body made of a nonmagnetic metal material.

3. The inkjet printing apparatus according to claim 2, wherein
- the spherical body is placed in plurals on the filter; and
- a ratio of projection areas of the spherical bodies with respect to an area of the filter is greater than or equal to 3% and less than or equal to 30%.

4. The inkjet printing apparatus according to claim 3, wherein the ink is an ultraviolet curable ink.

5. The inkjet printing apparatus according to claim 3, wherein the ink is a support material ink used for three-dimensional shaping.

6. The inkjet printing apparatus according to claim 2, wherein
- the spherical body is placed in plurals on the filter; and
- a ratio of projection areas of the spherical bodies with respect to the filter is ⅓ to 1/30 of an area of the filter.

7. The inkjet printing apparatus according to claim 6, wherein the ink is an ultraviolet curable ink.

8. The inkjet printing apparatus according to claim 6, wherein the ink is a support material ink used for three-dimensional shaping.

9. The inkjet printing apparatus according to claim 2, wherein the ink is an ultraviolet curable ink.

10. The inkjet printing apparatus according to claim 2, wherein the ink is a support material ink used for three-dimensional shaping.

11. The inkjet printing apparatus according to claim 1, wherein the ink is an ultraviolet curable ink.

12. The inkjet printing apparatus according to claim 11, wherein the ink is a support material ink used for three-dimensional shaping.

13. The inkjet printing apparatus according to claim 1, wherein the ink is a support material ink used for three-dimensional shaping.

14. An inkjet printing apparatus comprising:
- an inkjet head that moves in a scanning direction at a time of printing;
- a filter chamber provided on a path for supplying ink to a nozzle in the inkjet head; and
- a rolling element placed on a filter in the filter chamber; wherein
- the rolling element has a diameter larger than a mesh of the filter,
- the rolling element is disposed on the filter so as to be rollable by movement of the inkjet head,
- the rolling element is placed in plurals on the filter, and
- a ratio of projection areas of the rolling elements with respect to an area of the filter is greater than or equal to 3% and less than or equal to 30%.

* * * * *